United States Patent [19]
Landry et al.

[11] Patent Number: 5,397,081
[45] Date of Patent: Mar. 14, 1995

[54] INTERLOCKING PEDESTAL ASSEMBLY FOR A COMPUTER ENCLOSURE

[75] Inventors: Christian C. Landry, Harvard; Bradford G. Chapin, Littleton, both of Mass.; Ching-Chiang Chen, Taichung; Jause Kuo, Taoyuan, both of Taiwan, Prov. of China

[73] Assignee: Digital Equipment Corporation, Maynard, Mass.

[21] Appl. No.: 180,596

[22] Filed: Jan. 13, 1994

[51] Int. Cl.6 ............................................. A47B 91/00
[52] U.S. Cl. .................................... 248/346; 248/678; 248/917; 403/13; 403/329
[58] Field of Search ............... 248/346, 917, 146, 150, 248/159, 176, 676, 678, 558, 224.4; 403/13, 324; 108/902

[56] References Cited

U.S. PATENT DOCUMENTS

| | | | |
|---|---|---|---|
| 3,094,258 | 6/1963 | Punke | 248/346 X |
| 4,382,733 | 5/1983 | Rodgers | 248/346 X |
| 5,188,333 | 2/1993 | Schumacher et al. | 248/224.4 X |
| 5,263,668 | 11/1993 | Reiter | 248/346 |

*Primary Examiner*—Ramon O. Ramirez
*Attorney, Agent, or Firm*—Ronald C. Hudgens; Arthur W. Fisher

[57] ABSTRACT

A pedestal assembly having two opposing and abutting parts, each including a base portion, a wall, both a locking extension and a locking recess, such that the two parts interlock to create a floor region for holding a computer enclosure.

13 Claims, 8 Drawing Sheets

INTERLOCKING PEDESTAL ASSEMBLY FOR A COMPUTER ENCLOSURE

FIELD OF THE INVENTION

The invention relates generally to a pedestal assembly for supporting a computer enclosure, and particularly, to a pedestal assembly having interlocking parts for holding and providing stability to the enclosure.

BACKGROUND OF THE INVENTION

There is a need to ensure the stability of an upright, free-standing computer enclosure. Such units are, in fact, required to pass a regulatory "tip test".

A variety of pedestals or stands are known and in use at the present time and, although they provide an adequate level of stability to a computer enclosure, there are some significant drawbacks associated with them. Many are quite expensive to manufacture, involving multiple sheet metal welded structures or multiple molded plastic parts that are ultrasonically welded, heat staked or chemically bonded together to form a simulated one piece design. All require the use of some type of fastening technique and associated tool to attach the pedestal to the computer enclosure during installation. This step is both troublesome and inconvenient for the customer, as the necessary tool typically is not provided with the unit and the attachment step requires that the unit be placed upside down or turned on its side. Such handling of the unit presents a potential for injury to both the customer and the unit itself.

SUMMARY OF THE INVENTION

It is an object of the invention to provide an interlocking pedestal assembly that gives stable support to a computer enclosure.

It is a further object to provide a simple pedestal design that eliminates the need for fastening methods and hardware.

In a broad sense, the above and other objectives are attained by a pedestal assembly for holding a computer enclosure which comprises two parts that interlock to form a floor region and a wall extending along each of the interlocking parts.

In a narrower sense, objectives are attained by a pedestal which comprises a bail wire for lateral support to the rear of an enclosure placed thereon and a plurality of contact points on the base of the assembly.

The claimed invention has many advantages. For example, its simple, interlocking design provides for extreme ease of assembly, eliminating the need for fastening techniques and hardware. Subsequently, a computer enclosure can be placed in an upright position directly into the pedestal assembly. Moreover, the interlocking floor of the pedestal can be formed by two identical parts, thus providing the advantages of simplifying the manufacture of the assembly and reducing overall manufacturing, shipping and inventory related costs. The bail wire can also give the benefits of centering the unit on the pedestal and managing exiting cables. Additionally, the bail wire can serve to prevent the positioning of a computer enclosure unit in proximity to a wall where the required airflow from the enclosure would otherwise be obstructed. Such a provision for an enhanced airflow path is particularly essential to reducing thermal issues associated with front-to-back cooling systems. Lastly, the pedestal assembly gives the advantages of being easily dismantled and scalable in support of future enclosure requirements.

BRIEF DESCRIPTION OF THE DRAWINGS

The above objects, features and advantages of the present invention will become more apparent from the following detailed description taken in conjunction with the accompanying drawings, in which.

DESCRIPTION OF THE PREFERRED EMBODIMENT

Reference will now be made in detail to the presently preferred embodiment of the invention, an example of which is illustrated in the accompanying drawings.

The pedestal assembly of this invention includes an arrangement of interlocking parts which can hold and support a computer enclosure. The interlocking parts include two opposing and abutting parts, each having an inner and outer edge, a wall and a base portion. The base portion has connectors which include a form of locking extension and recess such that the locking extension and recess of one part mate with the respective same form of recess and locking extension of the opposing part. When joined in interlocking relationship, the opposing parts serve to create a base or floor of the pedestal.

Figure 1:
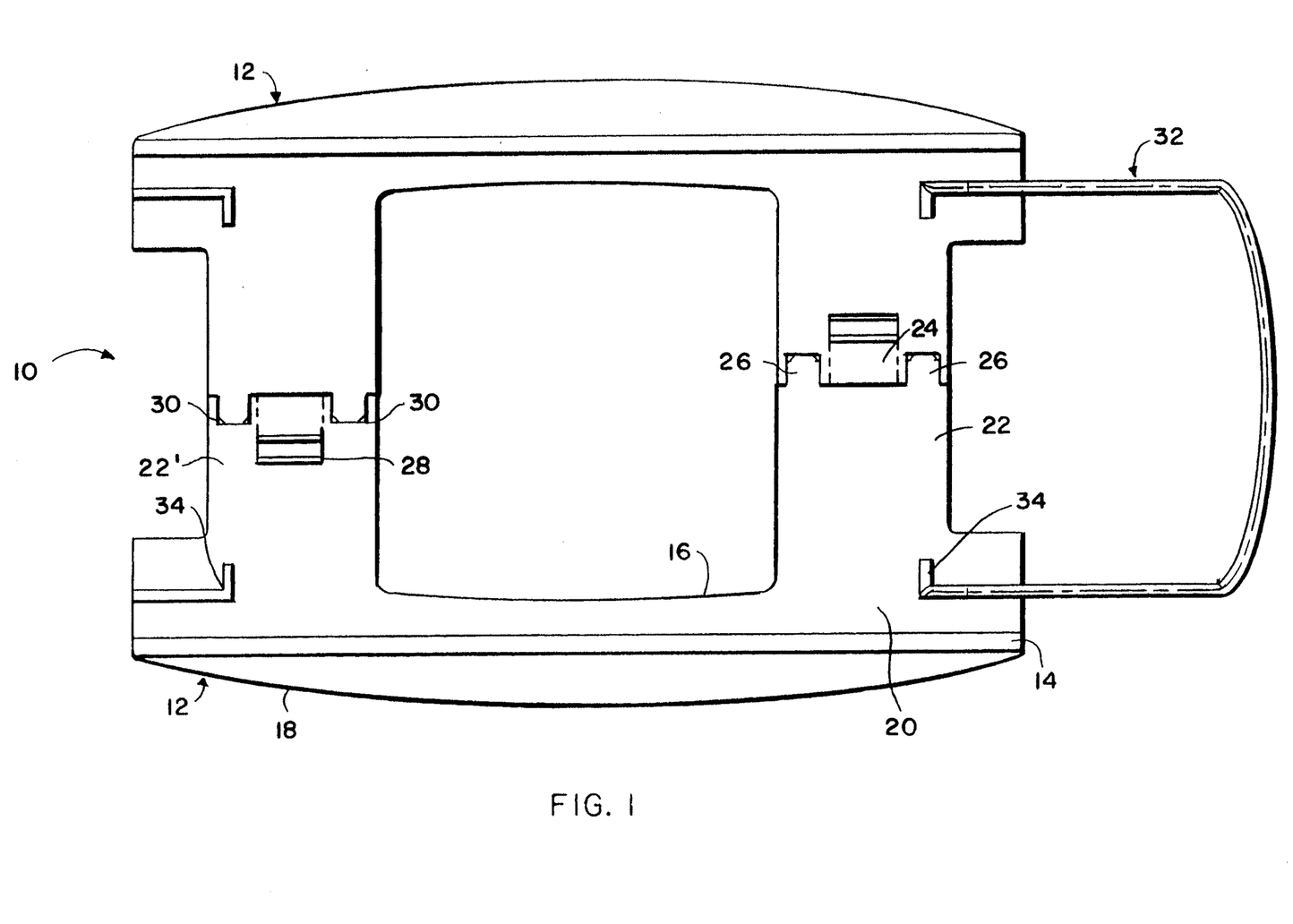
FIG. 1 is a top plan view of the pedestal assembly, according to the principles of the invention.

In the embodiment of FIG. 1, a pedestal assembly 10 is composed of two identical parts interlocked together, each identical part 12 is a single piece of molded plastic, and has a wall 14 that defines the floor of the pedestal. Each part 12, having an inner edge 16 and outer edge 18, further includes a base portion 20 having two connectors 22 and 22', each connector 22 including a center tab 24 and side tabs 26. Connector 22' has an opening 28 and two side recesses 30 for engaging the center tab 24 and side tabs 26 of connector 22, respectively.

Also in FIG. 1 is a bail wire 32 that pivotally mounts on each of the interlocked parts in grooves 34 as shown.

Figure 2:
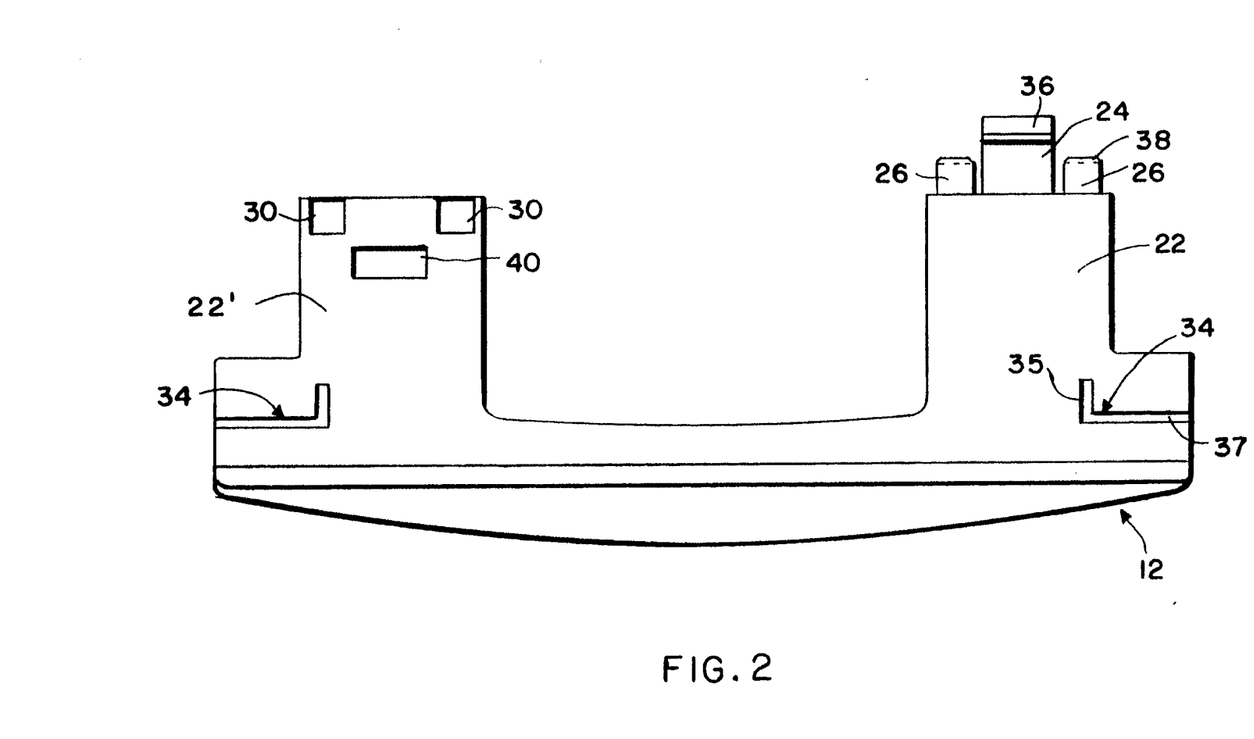
FIG. 2 is a top plan view of one of two identical, interlocking parts that comprise the floor of the pedestal assembly shown in FIG. 1.

As can be seen from FIG. 2, the center tab 24 and side tabs 26 are formed on connector 22 of part 12. Center tab 24 has a raised tip 36 with a chamfered edge and side tabs 26 each have an end 38 with a chamfered edge. The opening 40 of connector 22' is a through-hole opening used to catch and retain the raised tip 36 of center tab 24 of the opposing part. Side recesses 30 are formed to receive the side tabs 26 of the opposing part. Each identical part 12 has two identically shaped grooves 34 situated opposite one another on the base portion 20 as shown. Each groove has a lateral section 35 and a longitudinal section 37 as illustrated in FIG. 2.

Figure 3:
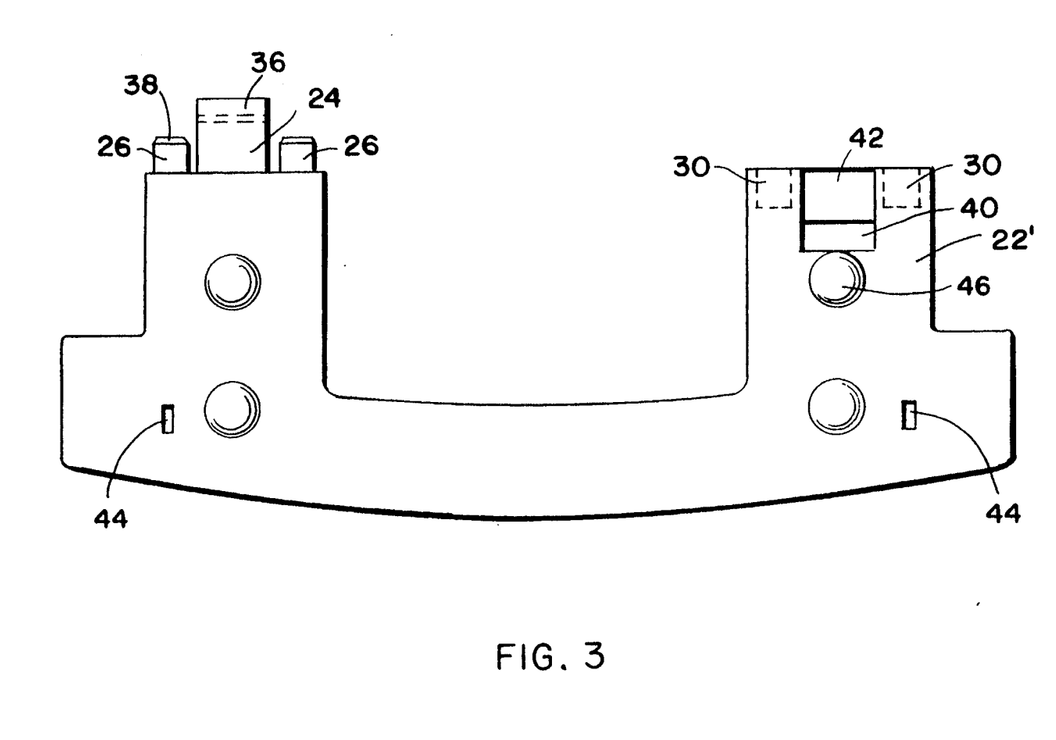
FIG. 3 is a bottom plan view of the interlocking part shown in FIG. 2.

The chamfered edged ends 38 of side tabs 26 can be clearly seen in the bottom view of part 12 shown in FIG. 3. A mid-section 42 between the side recesses 30 of connector 22' is shaped to guide the tip 36 of center tab 24 into opening 40. Additionally, locking passages 44, extensions of the lateral sections 35 of the grooves 34 of FIG. 2 but formed on the opposite surface of part 12 from grooves 34 in FIG. 2, are shown.

To interlock the opposing parts, the connectors 22 and 22' of one part are mated with the connectors 22' and 22 respectively of the other part such the opening and side recesses of connector 22' engage the center tab and side tabs of connector 22 respectively. While the arrangement of interlocking parts has been shown to include identical parts having connectors with either a form of locking extension that comprises a center tab and two side tabs, or a recess comprising an opening and two side recesses, alternative arrangements can be used. For example, the opposing parts, while retaining the same form of locking extensions and recesses, may be dissimilar in shape from one another, or, if identical, from the preferred embodiment. Another alternative could include a varied form of locking extension and recess. The form of locking extension and recess of each part, although the same as its opposing part, may be altered so as to result in a different type of interlock from the one shown. For example, the parts could be linked or plugged together.

Also shown in FIG. 3 are raised contact points, each contact point 46 in direct contact with the surface upon which the pedestal assembly is resting.

Figure 4:
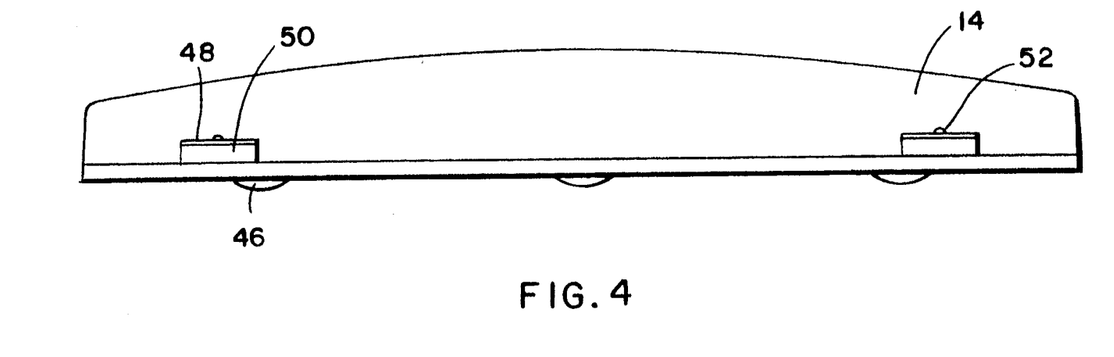
FIG. 4 is an inner side view of the wall of the interlocking part of FIG. 2.

In reference to FIG. 4, indentations are formed in the inner surface of wall 14. Each indentation 48 houses a rubber pad 50, which is used to reduce frictional contact between the walls and an enclosure, and includes a notch 52 to aid removal of the pad. Also shown is a side view of the raised contact 46.

Figure 5:
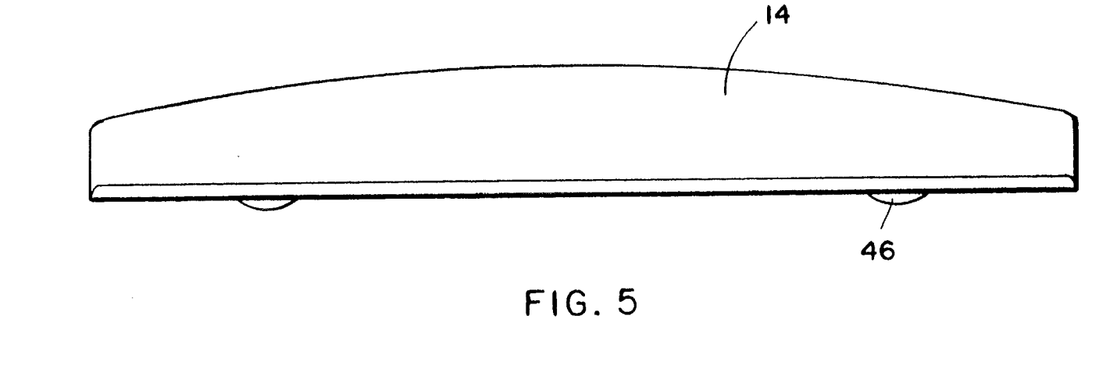
FIG. 5 is an outer side view of the wall portion of FIG. 4.

An outer surface of wall 14 is shown in FIG. 5, again with a side view of the raised contact 46.

Figure 6:
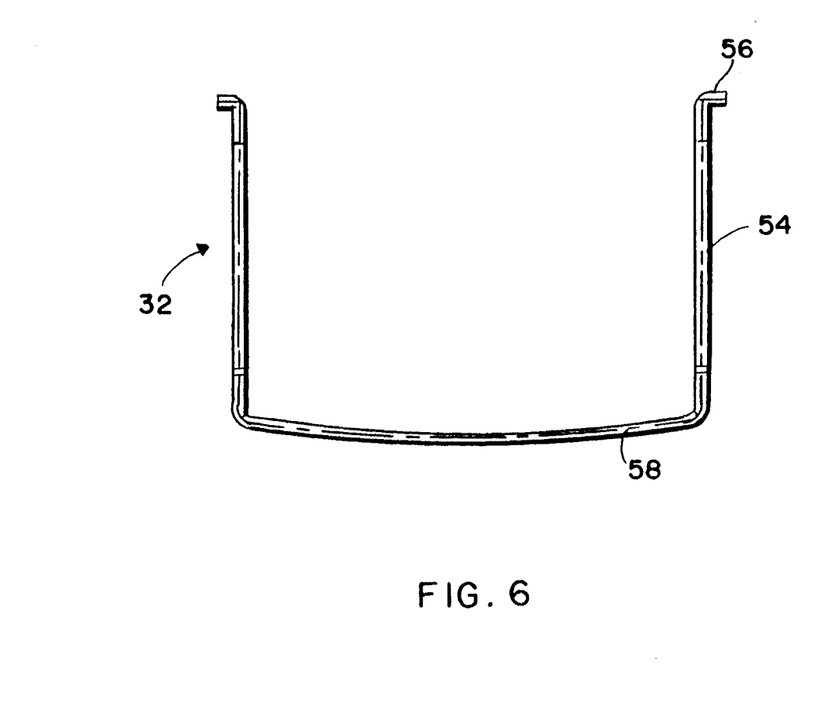
FIG. 6 is a perspective view of the bail wire of the pedestal assembly shown in FIG. 1.
Figure 7:
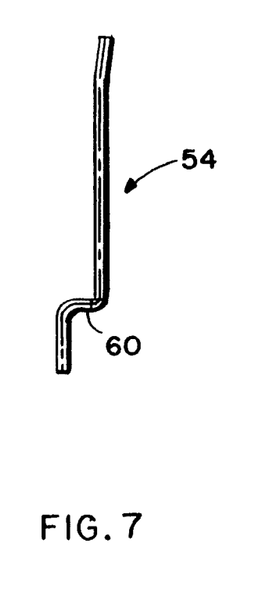
FIG. 7 is a side view of the bail wire of FIG. 6 showing another aspect of its form.

Referring to FIG. 6, the bail wire 32 is formed by two side wire sections, each side wire 54 having a foot wire section 56 at end and joined to each other at the end opposite the foot wire by a connector wire section 58. When the two side wire sections are compressed slightly, each foot wire section 56 can be inserted into the lateral section 35 of groove 34 (FIG. 2). Once inserted in the lateral section of the groove, the foot wire section slides through to the locking passage 44 of part 12 (FIG. 3), until the side wire sections come to rest in the longitudinal section 37 of groove 34 (FIG. 2). FIG. 7 shows an additional aspect of the side wire section 54, which is formed to include a vertical step 60 at some point between the foot wire and connector wire section of FIG. 6.

Figure 8:
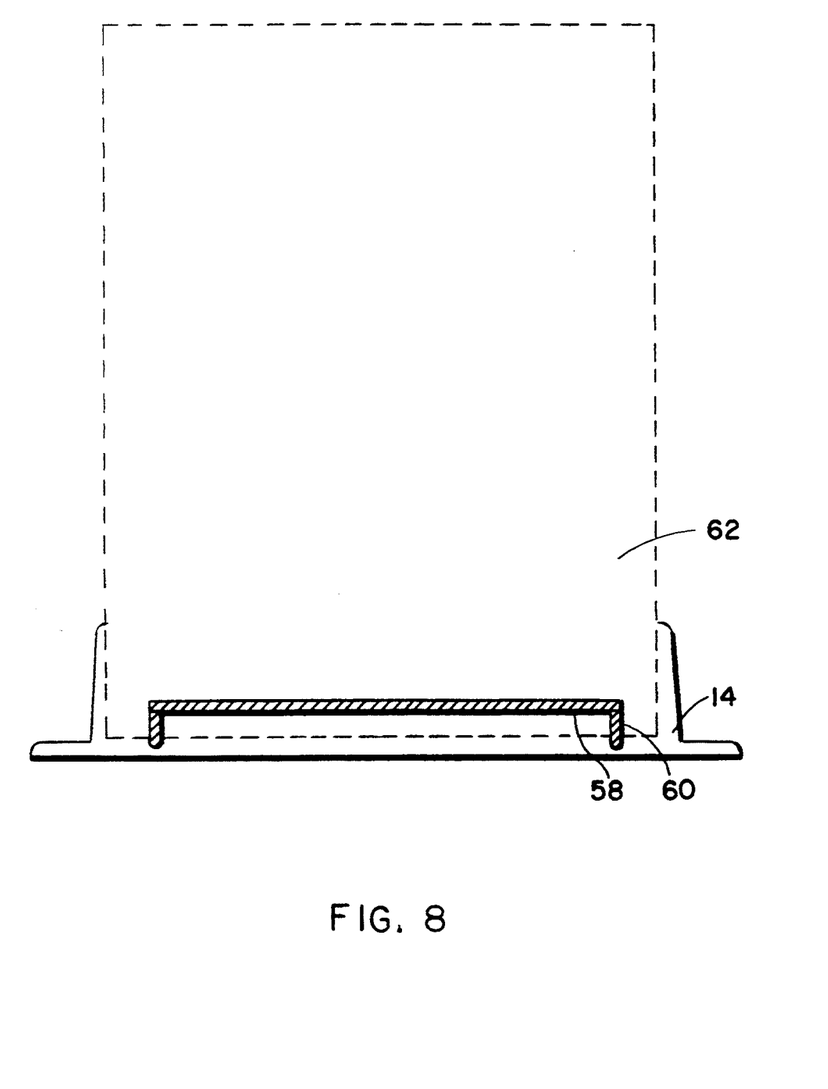
FIG. 8 is a rear view of the assembly of FIG. 1 shown with an enclosure (indicated in dash lines).
Figure 9:
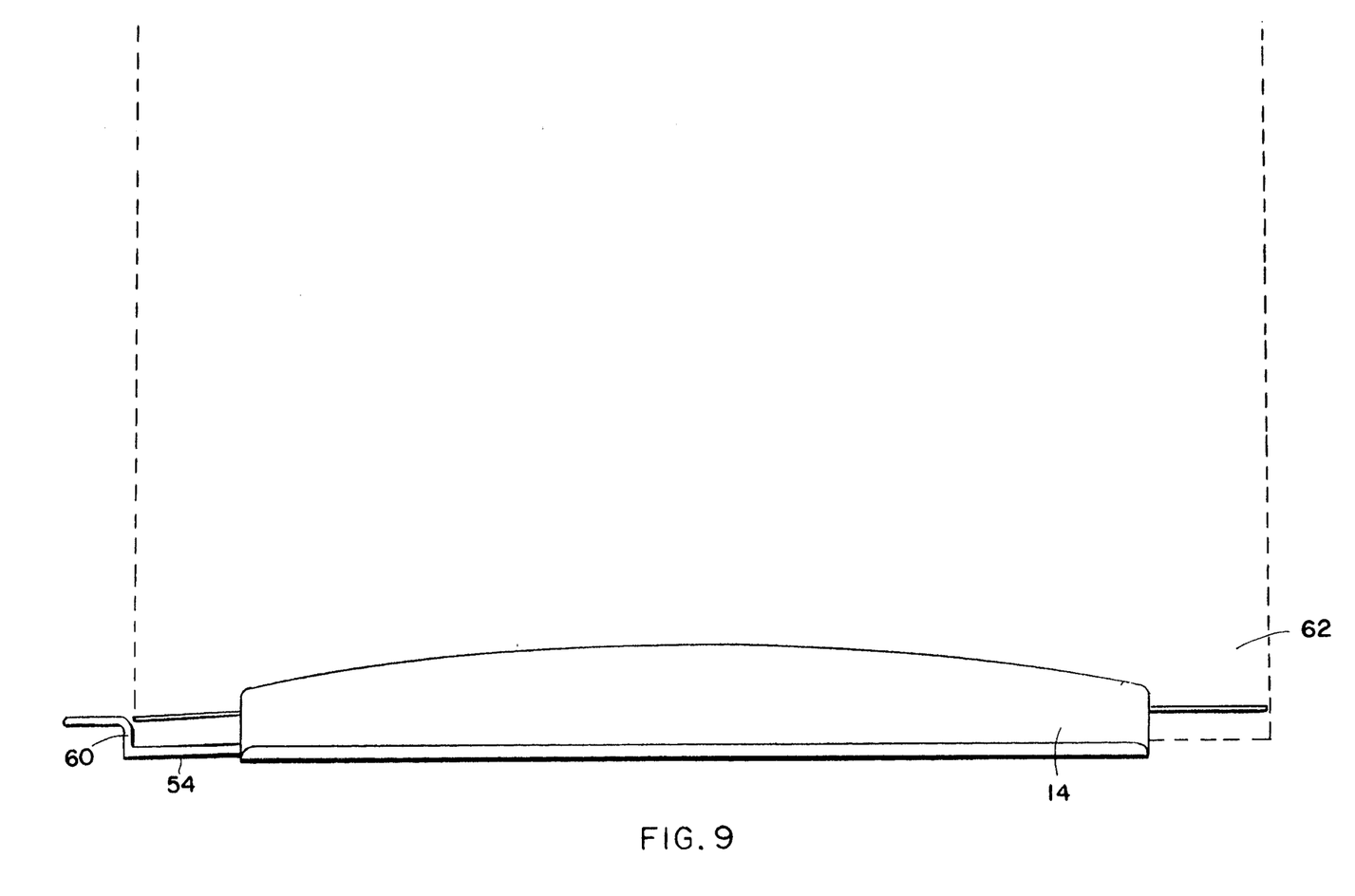
FIG. 9 is a side view of the assembly of FIG, 1 shown with an enclosure (indicated in dash lines)
Figure 10:
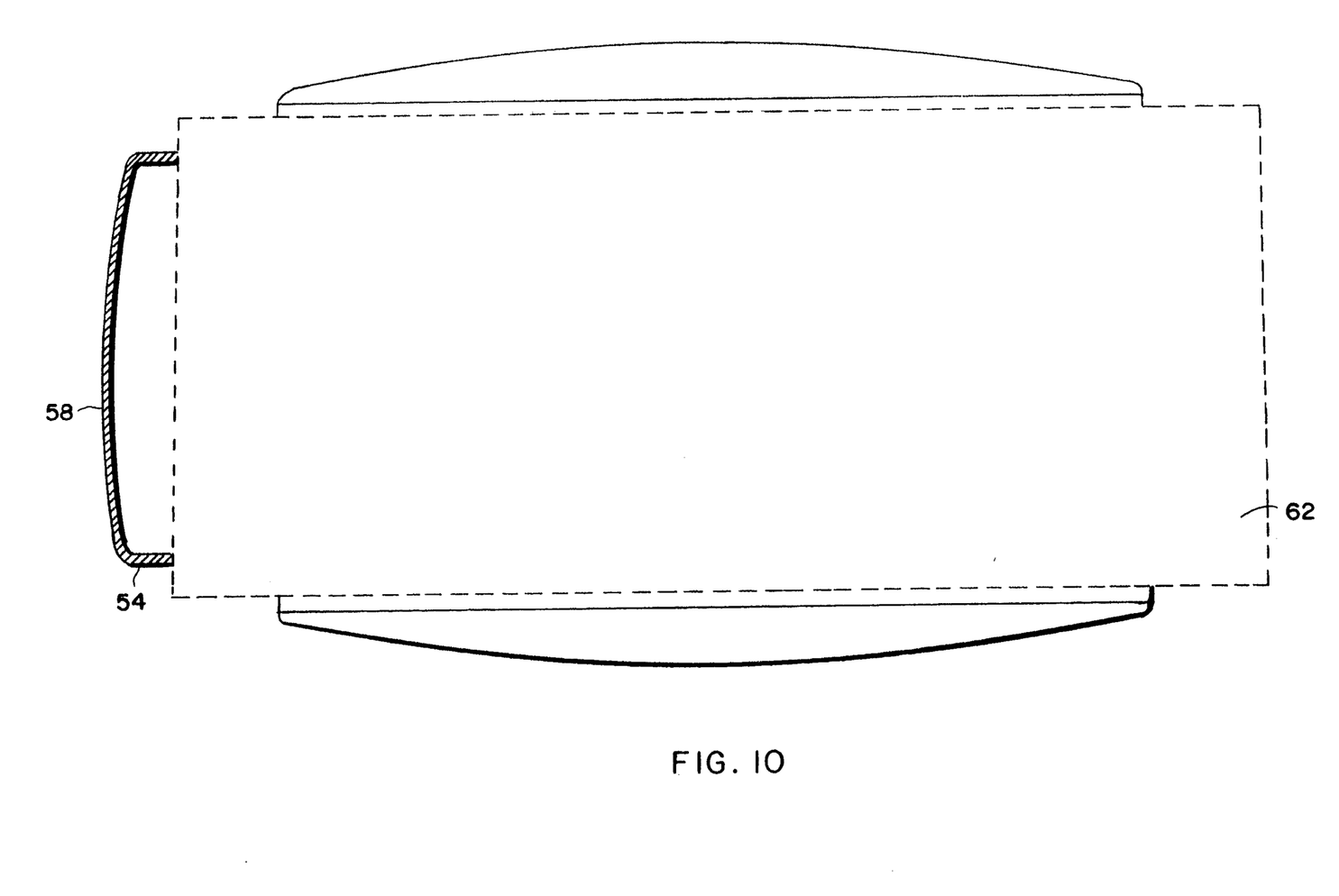
FIG 10 is a plan view of the assembly of FIG. 1 shown with an enclosure (indicated in dash lines).

For further clarification of embodiment and intended usage, FIGS. 8-10 illustrate the pedestal assembly holding an enclosure 62 (indicated in dash lines). FIG. 8 is a view from the rear of an enclosure 62, showing the connector wire section 58, vertical step 60 and wall 14. FIG. 9 is a side view, showing an enclosure 62 supported on a side by wall 14 and in the rear by the vertical step 60 in side wire section 54 of the bail wire. The extension of each side wire section beyond the floor region to the vertical step 60 is such that the positioning of the rear of an enclosure against the step would serve to center the enclosure on the floor region. FIG. 10 shows a plan view of the assembly holding an enclosure. The length of the side wire section 54 from the vertical step 60 (FIG. 9) to the joining of the side wire section 54 with the connector wire section 58 is clearly shown here. This length is determined to be that which would adequately distance the enclosure from a wall to allow the required airflow from the enclosure for purposes of cooling.

Although the above description has proceeded with reference to a specific embodiment of the invention, the invention is not necessarily limited to the particular embodiment shown herein. It is to be understood that various other adaptations and modifications may be made within the spirit and scope of the invention as set forth by the claims.

What is claimed:

1. A pedestal assembly for holding a computer enclosure comprising:

two opposing and abutting parts, each including a base portion with an outer edge and an inner edge, each of the parts further including a wall located between the two edges of its associated base portion and disposed to be generally perpendicular to such base portion, the spaced apart walls of the abutting parts extending generally parallel to each other to form a floor region therebetween for holding an enclosure, each of the base portions further including a locking extension and a locking recess in spaced part relationship at its inner edge, the locking recess of each base portion being configured to interlock with the locking extension of the other base portion, the locking extension on each base portion being positioned to engage the locking recess of the other base portion to join the two abutting parts of the assembly together in interlocking relationship with one another.

2. The pedestal assembly of claim 1 that further comprises:

a bail wire; and a means for pivotally mounting the bail wire on the base portions of the abutting and interlocked parts.

3. The pedestal assembly of claim 1 wherein the two abutting parts are identical.

4. The pedestal assembly of claim 3 wherein each of the parts is a single piece.

5. The pedestal assembly of claim 1 wherein each of the base portions includes two spaced apart connectors extending laterally inward of their associated wall, the end region of one of the connectors including the locking extension, the end region of the other connector including the locking recess.

6. The pedestal assembly of claim 5 wherein the locking extension comprises a central tab having a raised tip with a chamfered edge and two side tabs each having an end with a chamfered edge, the side tabs being situated in spaced apart flanking relationship on the opposing sides of the central tab, and wherein the locking recess comprises two side recesses, each side recess being dimensioned to receive a side tab of the opposing part, an opening being shaped to retain the raised tip of the central tab of the opposing part, and a mid-section between the side recesses being formed to guide the tip of the raised tip of the central tab of the opposing part into the opening.

7. The pedestal assembly of claim 2 wherein the bail wire further comprises:

two side wire sections, each of the side wire sections extending lengthwise beyond the floor region and forming a vertical step beyond the floor region at such a distance that the positioning of the rear of enclosure against the step would serve to center an enclosure on the floor region;

a connector wire section joining the two side wire sections together at a point beyond the vertical step of each of the side-wire sections, such that the connector wire section is positioned in a higher plane than that of the floor region and at some distance from the rear of an enclosure; and two foot wire sections, each attached to and extending outwardly from and at a right angle to an end of its corresponding side wire section not joined to the connector wire section.

8. A pedestal assembly of claim 2 wherein the means of pivotally mounting the bail wire further comprises:

two identically shaped grooves located opposite one another on the same surface of each base portion as the wall and situated between the wall and the inner edge, each groove having a longitudinal section and a lateral section, the longitudinal section capable of holding one of the side wire sections of the bail wire when the bail wire is mounted on the base portions, the longitudinal section extending from the outer edge of and parallel to the wall of its associated base portion and joining at a right angle the lateral section, the lateral section extending in the direction of the inner edge of the base portion and capable of receiving, upon compression of its associated side wire section, the foot wire section attached to such side wire section; and a locking passage formed on the opposite surface of each base portion from the grooves and being an extension of the lateral section of each groove, the locking passage capable of receiving, upon decompression of the side wire section, the foot wire section held by its adjoining lateral section.

9. The pedestal assembly of claim 1 wherein the wall further comprises:

at least two indentations along the lower inner region of the wall, spaced apart from each other and equidistant from the ends of the wall; and rubber pads housed in the indentations of the wall, the thickness of the pads slightly greater than the depth of the indentations for frictional contact with the enclosure.

10. The pedestal assembly of claim 9 wherein the indentations further comprise:

notched regions whereby the pads are removable.

11. The pedestal assembly of claim 1 wherein the parts each have a plurality of raised contact points.

12. The pedestal assembly of claim 1 wherein the abutting parts are made of molded plastic.

13. The pedestal assembly for holding a computer enclosure comprising:

two opposing and identical parts, each including a base portion with an outer edge and an inner edge, each of the parts further including a wall located between the two edges of its associated base portion and disposed to be generally perpendicular to such base portion, the spaced apart walls of the parts extending generally parallel to each other to form a floor region therebetween for holding the enclosure, each base portion further including two spaced apart connectors extending laterally inward of their associated wall, the end region of one of the connectors including the locking extension, the locking extension comprising a central tab having a raised tip with a chamfered edge and two side tabs each having an end with a chamfered edge, the side tabs being situated in spaced apart flanking relationship on the opposing sides of the central tab, the end region of the other connector including a locking recess, the locking recess comprising two side recesses, each side recess being dimensioned to receive a side tab of the opposing part, an opening being shaped to retain the raised tip of the central tab of the opposing part and a mid-section between the side recesses being formed to guide the tip of the raised tip of the central tab of the opposing part into the opening, each of the base portions further including two identically shaped grooves, each groove located on the same surface of each base portion as the wall and being situated between the wall and the inner edge but opposite one another, each groove having a longitudinal section and a lateral section, the longitudinal section extending from the outer edge of and parallel to the wall of its associated base portion and joining at a right angle the lateral section, the lateral section extending in the direction of the inner edge of the base portion, a locking passage formed on the opposite surface of each base portion from the grooves, the locking passage being an extension of the lateral section of each groove;

a bail wire for supporting the rear of the enclosure, the bail wire being formed to interlock with grooves and locking passages on the same side of each base portion, the bail wire including two side wire sections, each of the side wire sections formed to fit, upon slight compression, into the longitudinal section of the groove of one base portion, the side wire sections extending lengthwise beyond the floor region and forming a vertical step beyond the floor region at such a distance that the positioning of the rear of enclosure against the step would serve to center the enclosure on the floor region;

a connector wire section joining the two side wire sections together at a point beyond the vertical step of each of the side wire sections, such that the connector wire section is positioned in a higher plane than that of the floor region and at some distance from the rear of the enclosure;

two foot wire sections, each attached to and extending outwardly from and at a right angle to an end of its corresponding side wire section not joined to the connector wire section, each foot wire section fitting, upon compression of its associated side wire section, into the lateral section of the groove of one base portion, and upon decompression of same side wire section, sliding into the locking passage of such base portion; and a plurality of raised contact points on the lower surface of the abutting parts.

* * * * *